United States Patent [19]
Tekathen et al.

[11] Patent Number: 5,170,882
[45] Date of Patent: Dec. 15, 1992

[54] REVERSIBLE TOOTH LINK BAND

[75] Inventors: Johann Tekathen, Dinslaken; Reinold Krohm, Herne, both of Fed. Rep. of Germany

[73] Assignee: HT Maschinenvertrieb GmbH, Bottrop, Fed. Rep. of Germany

[21] Appl. No.: 601,761

[22] PCT Filed: Jan. 29, 1990

[86] PCT No.: PCT/DE90/00053
§ 371 Date: Jan. 31, 1991
§ 102(e) Date: Jan. 31, 1991

[87] PCT Pub. No.: WO90/09941
PCT Pub. Date: Sep. 7, 1990

[30] Foreign Application Priority Data
Feb. 24, 1989 [DE] Fed. Rep. of Germany ....... 3905754

[51] Int. Cl.$^5$ .............................................. B65G 19/24
[52] U.S. Cl. ................... 198/731; 198/729; 198/734
[58] Field of Search ................... 198/729, 731, 734

[56] References Cited
U.S. PATENT DOCUMENTS
4,747,481 5/1988 Gorlov et al. ................. 198/731

FOREIGN PATENT DOCUMENTS
2211922  9/1973  Fed. Rep. of Germany .
2535914  3/1976  Fed. Rep. of Germany .
2841619  4/1980  Fed. Rep. of Germany .
2907708  9/1980  Fed. Rep. of Germany .
3320220 12/1983  Fed. Rep. of Germany .
3235471  3/1984  Fed. Rep. of Germany .
3246490  7/1984  Fed. Rep. of Germany .
3400823  9/1984  Fed. Rep. of Germany ...... 198/731
3510657  8/1985  Fed. Rep. of Germany .
3514103 10/1986  Fed. Rep. of Germany .
3535735  4/1987  Fed. Rep. of Germany ...... 198/729
 781108  5/1935  France .......................... 198/731

Primary Examiner—Joseph E. Valenza
Attorney, Agent, or Firm—James Creighton Wray

[57] ABSTRACT

Chain webs for chain conveyors, which are primarily used in underground mining and in tunnel building for the transport of large quantities of materials, consist of mutually engaging horizontal and vertical chain links in which the horizontal links of the two adjacent chains are joined by a one or two-piece bracket running across their longitudinal direction, sufficiently raised above them and having a reversible tooth shape. This results in a kind of toothed chain providing the optimum power transmission from the chain wheel to the chain web, where both chains run exactly in the middle of the belt, as is usual in double-centered chain conveyors. The special shape of the reversible teeth makes it possible to use such a chain web on both sides and to move it forwards and backwards without any risk. Owing to the smooth and broad-based power transmission, the reversibility of such chain webs and the optimal conveying properties, times between breakdowns are substantially longer, which is of special importance in underground mining on account of the high rates of wear prevailing there. This is especially true of the two-part brackets connected by a heavy-duty spring sleeve.

19 Claims, 8 Drawing Sheets

REVERSIBLE TOOTH LINK BAND

BACKGROUND OF THE INVENTION

The invention refers to a chain conveyor with chain band, particularly a double middle chain band utilized in transportation of mass goods in underground mining and tunnel construction, which is assembled from horizontal and vertical track links that are interlocking, and which is provided with pushers guided in the conveyor trough and is fitted in its partition to the chain wheels that are arranged on the ends of the conveyor trough rope, whereby the chain links have enlarged bearing surfaces which make possible a good introduction of force from the chain wheels into the chain band.

These types of chain bands with interlocking chain links are used in underground mining and tunnel construction, particularly for transportation of mined coal and rocks. Equivalent chain bands, however, are also used above ground. There, the chain bands are pulled by pressure type conveyor troughs, which are, therefore, exposed to especially high attrition. During the past years, in the development of conveyor chains, larger and larger dimensions were selected exclusively, in order to satisfy ever growing performance requirements. This development, however, has been unsatisfactory since it still does not diminish attrition, but, especially, since only an adverse introduction of force of the chain wheels into the chain bands is possible when using the round link tracks that have been in use to date. In addition, the shape of the conveyor troughs poses a dimensional limit for the chain bands.

The introduction of force in the known chain conveyors takes place via the chain wheels, which are arranged on the end sides of the conveyor trough and are connected with the driving gears or with a driving gear. In the chain bands being used today, the chain drum or chain wheel and the round link chain come into contact only punctually, which results in very high surface pressure in these punctual areas of contact. Chain bands that have been in use for a longer while, therefore, have visible notches in the areas of contact, i.e., in the area of rolling off, and show a so-called ducktail attrition, which is caused by high surface pressure. This adverse and unsatisfactory introduction of force is the essential weak point of the round link tracks used almost exclusively today, and limits their life span considerably.

A form of track link known by DE-PS 694 515 shall achieve an improved introduction of power, whereby the chain links on both ends are built at a right angle. So far, however, this has been disadvantageous in that the attrition on the chain links, even on the end designed in a right angle, occurs so soon that only an insignificantly extended service life can be achieved for the cross-section still used. In addition, the corresponding edged chain links are a danger to the vessels of the conveyor troughs and, finally, for the area of the chain wheel. Besides, their production requires a considerable effort. Similar chain links are also known from the DE-AS 22 47 300, where the individual tail areas are designed in edged form, to enable better transmission of force. Here, also, the corresponding edged formations do not offer an advantageous form for the whole conveyor, especially since this design is exposed to extreme attrition.

In more recent times, so-called harness chain bands have been used, which are designed to avoid the punctual attack of force to the chain links that had been disadvantageous so far. In return, the requirement for a large amount of material is accepted and, as an additional essential disadvantage, completely altered chain wheels that are required due to the large partition distance of 770 mm. Therefore, traditionally, only three-tooth cylindrical lantern gears or chain wheels are used, whereby, due to the large pocket slack necessary, irregular operation, shocks and impact effects with high spikes are the result.

For the purpose of making possible an improved introduction of force and, particularly, improvement of use in rolling curve operation, another chain band is provided with a chain band where the vertical chain links are equipped with welded-on driving tappets that extend on each side in a cross angle and right angle to the direction of pull. If necessary, wearing caps may be put on top of these driving tappets, which are fitted to the form of conduct of the conveyor trough, which results in well shaped pushers. Except for the somewhat expensive connection of the wear caps with the actual pushers, i.e., the driving tappets, it is disadvantageous that special constructions are necessary which improve the introduction of force, which may be used as double chain band with appropriate effort, but will then merely achieve an insufficient transportation effect, because the pushers lie only punctually on the tread of wheels of the conveyor troughs.

SUMMARY OF THE INVENTION

The invention intends to create a chain conveyor with a multiple-use chain band, particularly for use underground with substantially improved power transmission between the chain band and chain wheel and good transporting properties.

This task is solved according to the invention in that the horizontal chain links of the chain ropes arranged alongside of each other have a central grouser running horizontal and askew to their longitudinal direction, which is formed as a bow extending beyond them and having the shape of a reversible tooth fit for the tooth spaces, and connecting the chain links with each other.

This results in a chain conveyor with a chain band, mainly a double chain band, which can be driven forward and backwards, and which can be reversed without major effort after experiencing adequate attrition, so it is available once more for the same service life. Based on the special reversible tooth shape, not only is a good transporting effect and multiple use possible, but, above all, an optimal introduction of force from the chain wheels into the chain band is also guaranteed. This is primarily due to the special formation of the individual bow, which forms a tooth chain band that ensures that there is no longer a punctual introduction of power, but, even more so, a planar introduction of force. Based on this fact, the stress of the individual bows is substantially decreased, which, in turn, results in significantly increased service lives. The individual chain ropes can be connected simply and practically with each other by means of the invented chain bow.

A practical model of the invention provides that the bow and the horizontal chain links of both chain ropes form one assembly unit. This results in stabilization of the chain band, which, in turn, results in an even introduction of the chain band into the area of the chain wheels and, at the same time, the smooth transmission of force in the area of the teeth.

Equal stress on both chain ropes, which are conducted alongside each other and connected with each other by a bow, is ensured by an invention model where the bows are connected with each other by a heavy spring cartridge that can be plugged into both, and a continuously formed threaded rod. This model ensures a uniform introduction of force, even in case of a non-plane-parallel insertion or catching of both chain ropes or their applicable bow, because the connection of both bows or both chain ropes over the heavy spring cartridge allows for a certain balance.

A particularly stable model for the bow and, thus, for an extensive plane shaped introduction of force in the range of the chain wheels is made possible, in that the bows form an ellipse in their section, which is again cut off in the range of the crown, thus forming a sliding surface. Besides the good introduction of force due to the appropriate tooth flanks of the bows or the chain wheels, an advantageous sliding surface results for each individual bow on the running path of the conveyor trough by an additional shaping of the bow, so that, with good attrition properties, a good transport of the material to be conveyed is still guaranteed. Based on the close arrangement of the individual bows, the larger coal pieces and other pieces of transporting goods are also nearly carried off the chain band, without themselves causing any attrition on the tread of wheels of the conveyor trough. On the other hand, the finer grain coal falls through the tread of wheels of the conveyor trough and, here, causes a good lubrication effect which adds to the reduction of attrition. For practical purposes, the sliding surface is built in a concave shape according to the invention, so that cleansing edges result, which ensure that a continuously balanced transport is guaranteed even with damp material to be conveyed and that caking is safely avoided.

The chain ropes in the invented solution are preferably arranged so closely next to each other that it nearly results in a chain band. Here, the invention provides that the horizontal chain links are built exactly in the middle, extending on both ends over the bow. Thus, an equal distance of the bows is guaranteed and, in addition, the insertion of the vertical chain links is optimally ensured. Based on this form, these types of chain bands may also be used for roll-curve operations, especially when, as mentioned, both horizontal chain links are looped or arranged close to each other and central to the bows.

To reduce the weight of such a chain band, the invention provides that only some bows run in the guides of the conveyor trough. The others, however, are built shorter and have, therefore, less weight, which, on the other hand, also results in weight reduction of the total chain band. In order to perform the guiding on any optional location on the chain band, the invention provides that the bows have bores on each end which run in the direction of the conveyor, and which are built corresponding to the connecting bores of guide caps that are fit into the guides of the conveyor trough. Due to the course of the bores and the connecting bores, the connective bolts can be fit in horizontal position, where they are exposed to virtually no attrition and, therefore, are not only easy to assemble but, above all, are also more attrition-resistant.

Mounting of the guide caps afterwards is facilitated by the fact that the guide caps have a recess with negative reversible tooth shape. The guide caps are, thus, pushed onto the appropriate bows from the side, and then tightened with the connective screw.

Again, to increase stabilization, but also to design a chain band model that is as inexpensive as possible, it is planned that the bow and the pertaining horizontal chain links are wrapped in the swage as assembly units. Here, it is advantageous that the whole bow is wrapped in the swage with the moulded-on chain links in one work process, so that secondary treatment is practically unnecessary, especially such activities as welding, which are very expensive.

The aforementioned attrition on the chain links (duck tail attrition) can be avoided extensively if, as suggested in the invention, the vertical and horizontal chain links are built in the form of cups in the revolving range and thus form a planar unit. With this particular shape it is achieved that the chain links interlock flatly in the attrition range which results in joints carrying full weight, and which allow for a substantially greater range of use for this type of chain conveyor with chain bands. Therefore, it is possible to drive or to equip these types of chain conveyors with chain bands with front drive, to use track spreaders, as well as to provide intermediate motors in case of great total lengths.

The vertical chain links, on the other hand, are intentionally spared from attrition in another model of the invention where the line of section with the elliptical bows is arranged in a way that the bows extend over the vertical chain links on both sides askew to the direction of the conveying action. This way, the entire chain band is carried virtually exclusively by the bows, while the chain links do not come into any contact with the conveyor trough. This results in the advantage that all of the attrition can be concentrated on the bows, which, according to the invention model, are reversible and, therefore, achieve a substantially increased service life.

In those places where bows are not necessary due to individually low transporting volume or for other reasons, e.g. minimization of weight, a chain band can be used where a horizontal blank chain link and additional vertical chain link is inserted between the bow with the horizontal chain links and the vertical chain links. Thus, the number of bows is decreased by half, but sufficient power transmission is still possible in the range of the chain wheel, because, due to the partition, a still sufficient amount of "teeth" are in the gearing. This occurs particularly when the blank track link has the same dimensions as the horizontal chain links, so that both chain bands can be used on the identical chain wheels without necessitating reconstruction, adjustment or similar action. In this model, also, the reversal of the whole chain band is possible, which enables multiple use, as well as the driving of the chain band in both directions, without the possibility of problems, particularly catching at the joints of the conveyor troughs or on other parts, especially the chain wheel.

In underground mining, chain conveyors, particularly those cooperating with chain cutting machines, are often used with so-called roll curves. Here, the chain band is angled at an angle of 190° and guided in the conveyor trough. Based on this strong rerouting, only so-called single-chain chain bands can be used, since damage could occur otherwise due to unbalanced stress of several chain bands. Such damage is avoided, according to the invention, in that the straddle bow without guide caps which is arranged between two bows with guide caps is connected with both chain bands and doubles the distance between the chain bands. If such a chain band is guided over a rolling curve, the inner chain rope is relieved when the outer chain rope is stressed accordingly, but, due to the straddle bow, it is shifted in such a way that it still remains tensed, whereby damages are avoided, particularly those that result in disruption of the conveying activity. Based on this good guiding of the whole chain band, larger conveyors and those with double-chain bands may be used, which not only make possible an increased service life, but, above all, smoother and increased conveying performances.

The mentioned effect caused by the straddle bow can also be increased purposefully by connecting the chain ropes non-centrally with the bows, or by moulding on the horizontal chain links to the bows away from the middle. Another possibility is to arrange the chain links on each end of the straddle bow and to connect them with it. Finally, there is the possibility to arrange, preferably to mould on, the horizontal chain links on both sides of the bow edges and to the middle of the straddle bow. In this model, too, the described effect will be achieved.

The evenly planar arrangement of the chain links with each other or to each other is facilitated by the fact that the vertical chain links have an interim piece that has rounded-off inside edges. Thus, a good interlocking guidance of the chain links is ensured.

The quick connection of the bows of adjacent chain ropes with each other can be achieved in that the bows have graded bores which take up the heavy spring cartridge, and which, at the same time, are built to take up the connective tappets of extension pieces. Thus, all that is needed is to insert the heavy spring cartridge into one of the graded bores of one bow, then to slip the other bows over it and, finally, to permanently connect the whole thing with the heavy spring cartridge. The heavy spring cartridge has a certain slack between the adjacent bows enabling a diameter.

With this model, also, the guides are practically connected separately with the bows. Therefore, they are not an assembly unit. Rather, it is so designed that the threaded rods are built to extend beyond the bows and to co-fasten the guide caps. Thus, the guide caps are simultaneously fastened when the threaded rod is inserted and fastened. This allows for the possibilty of abandoning the use of guide caps in certain areas and to use bows without guide caps.

Twisting resistance for the guide caps and easy handling are achieved if, according to the invention, the bows on the side facing the guide cap equally have a graded bore and, in addition, have a recess, whereby the graded bore and the recess arranged on both treads of wheels are formed corresponding to carriers arranged with the guide caps. The graded bore allows for the insertion of the carriers of the guide caps, whereby the carriers catch into the corresponding recesses simultaneously, so that an effective twisting resistance is created. Since now graded bores are provided on both sides, the bows according to the invention may be used as desired, and an advantageous assembly system results, which allows for multiple use possibilities, thus covering a large range of problems.

Substantial improvement is achieved for the tooth wheels or the chain wheels as well, in that the chain wheels which have recesses adjusted to the chain links are built in two parts, where the line of partition runs through the teeth. This two-part model has advantages because the chain wheels have to be mounted onto the driving shaft, while the separation line running through the teeth has the advantage that a simpler connection is possible, which can be achieved here according to the invention, because enough substance is available due to its particular shape.

Contamination of the chain wheel is avoided effectively in that the teeth spaces are built in elliptical shape according to the bows, while the ellipse bow is shaped towards the inside. The bows, therefore, slide into teeth gaps in which material to be conveyed cannot manifest itself because the bow of the ellipse reaches deeper than the bow could reach into the teeth gaps. This purpose is served additionally by a model whose groove between the flanks of the teeth and the teeth gaps is built deeper than the ellipse bow. This way, material to be conveyed can be pressed into this groove if necessary, without being able to influence the engaging of the bows into the teeth gaps. The conveyor dirt that might manifest itself in the groove is safely carried out in that a stripper reaching into the deepest spot of the groove and with a balancing plate is arranged on the chain wheel.

The invention distinguishes itself especially in that a chain band that can be used as a double-chain band and adjusted chain wheels are created, which are particularly well suited in their construction for use underground. Due to their construction as some type of tooth chain, the model according to the invention allows for an optimal power transmission between chain band and chain wheel. Based on the multitude of bows forming the tooth chain, a substantially improved transporting effect is achieved, which, in addition is facilitated by the fact that a proportional grinding on the tread of wheels of the conveyor trough results from the shape of the bows, thereby achieving an even transport movement and preventing caking. This way, optimal transporting properties result. Another essential advantage to be pointed out is that, although the life span of such a chain band is already increased, an additional extension of life is possible because these types of chain bands can be reversible to remain operable once more for virtually the same operating time. In total view, this means the achievement of a substantially improved chain band and improved chain wheels which, as seen as a whole, result in an optimum chain conveyor, which can be driven forward as well as backwards, can be used in variable ways, may be used in curves or roll-curves, and which guarantees longer service life and improved transporting effect. Another advantage is the fact that such a chain conveyor can be used with head drive, because the chain band is built symmetrically. Chain tighteners can be used, as well as intermediate drives, so that greater conveyor lengths may be achieved in total. The head drive is good for the transfer of the goods to be conveyed in the stretch range, whereby the length of the protruding head drive is variable.

Further details and advantages of the invention can be seen from the following description of the pertaining illustration, which depicts a preferred example model with the necessary details and individual parts.

BRIEF DESCRIPTION OF THE INVENTION

FIG. 1; a conveyor trough with reversible tooth link band, in top view;

FIG. 2; this type of chain band shown from the side with bows depicted in sections;

FIG. 3; a section through a conveyor trough with chain band in use;

FIG. 4; a chain band changed in weight by adding chain links;

FIG. 5; a chain wheel in sectional view;

FIG. 6; a conveyor trough with reversible tooth link band in side view;

FIG. 7; the model seen in FIG. 6 in top view;

FIG. 8; a pusher with guide caps, section;

FIG. 9; a pusher without guide caps, section;

FIG. 10; a chain wheel parted over the teeth;

FIG. 11; a vertical chain link with horizontal chain link with planar grip;

FIG. 12; an enlargement of the rolling range of both chain links;

FIG. 13; a single chain band;

FIG. 14; a double chain band, and

FIG. 15; a chain band usable for bunker construction or carry-off conveying;

DETAILED DESCRIPTION OF THE INVENTION

Figure 1:
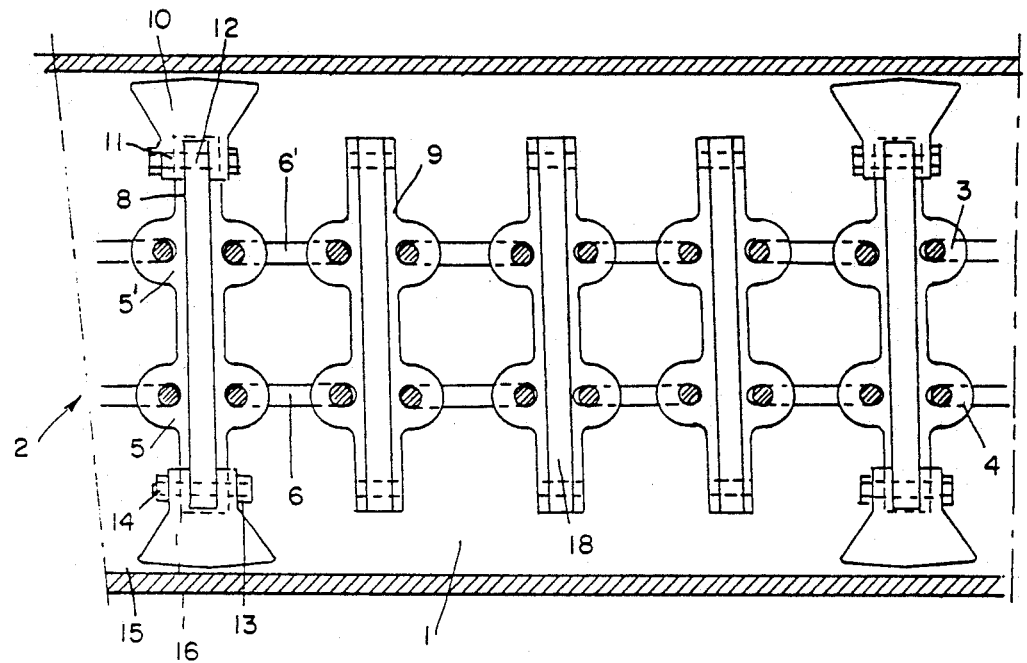

In the conveyor trough (1) depicted in FIG. 1, the lateral guides are cut off, so as to be able to depict the whole chain band (2) completely. The chain band (2) depicted in FIG. 1 consists of two chain ropes (3,4), running parallel to each other, which each are assembled with horizontal chain links (5, 5') and vertical chain links (6, 6').

As FIG. 1 shows, the horizontal chain links (5, 5') are each connected over bows (8, 9) and form an assembly unit. These bows are each connected by one or two vertical chain links (6, 6') running parallel to each other, so that such a chain band (2) may also be called a tooth chain band. The individual teeth have involute shapes.

Individual bows (8, 9) show guide caps (10) on its ends, which slide in the guide (15) of the conveyor trough (1) in such a way that the whole chain band (2) is securely guided, even if not all bows (8, 9) are provided with such a guide cap, as is also depicted in FIG. 1. In order to be able to exchange the individual guide caps (10) or to attach them to more of the depicted bows (9), all bows (8, 9) have to be provided with bores (12), which are built corresponding to the connective bores (11) of the guide caps (10). Horizontal connective bolts (13) are inserted into these bores (11, 12), to connect the guide cap (10) with the bow (8). By simply tightening the nut (14), sufficient contact of guide cap (10) and bow (8, 9) can be achieved, and this connection may be loosened again accordingly. Mounting is facilitated in that the guide caps (10) have a recess (16) adjusted to the shape of the bow (8, 9). If the guide cap (10) is slipped over the end of the bow (8, 9), only the already mentioned connective bolt (13) need be inserted.

Figure 2:
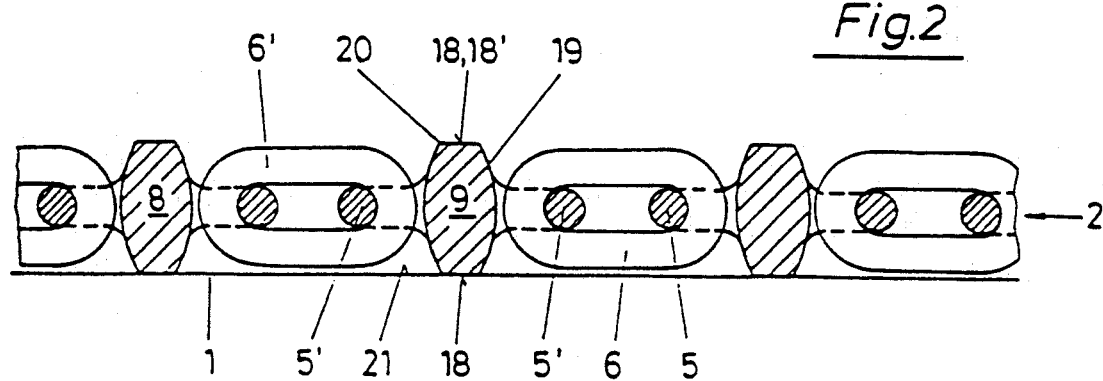

The chain band (2) depicted in FIG. 1 is depicted in FIG. 2 in side view, where the individual bows (8, 9) are depicted in section, so that their basic form is also well visible. The bows (8,9) virtually depicting an ellipse in section (8,9) are cut off in the range of the crown (20) which results in a sliding surface (18) that lies on top of the tread of wheels (21) of the conveyor trough (1), as shown in FIG. 2. A good conveying action effect can be achieved with this even sliding surface (18) and the corresponding rounding of the tooth flanks (19), especially; however, a calm run of these types of chain bands (2) even in underground mining. FIG. 2 shows that the individual bows (8, 9) extend insignificantly beyond the vertical chain links (6) so that these do not even lay on top of the track surface (21) and are, therefore, virtually spared from attrition.

Based on the symmetrical construction of the individual bows (8, 9), the whole chain bands (2) may be pulled not only in both directions, but may also be reversible so that, with its normal attrition, the operating time or life span of such chain bands (2) may be increased intentionally by means of corresponding reversal.

Figure 3:
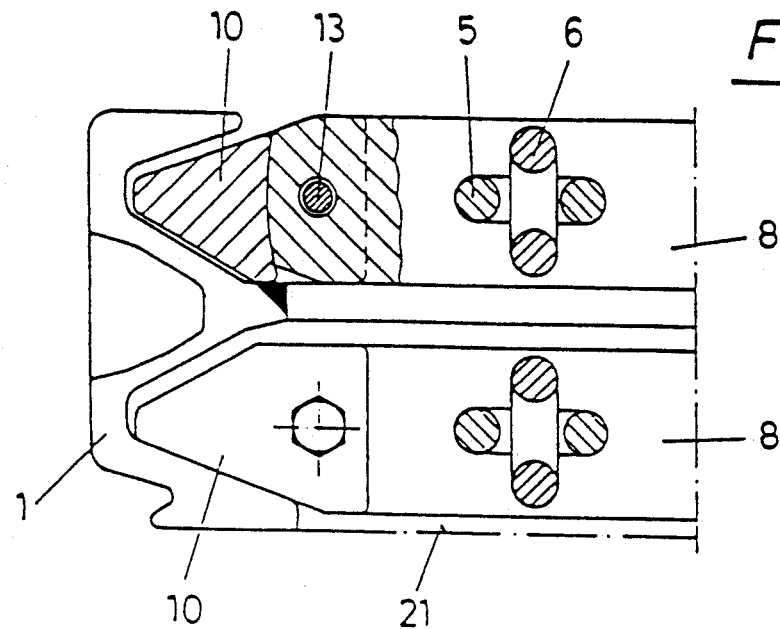

In the section of a conveyor trough (1) according to FIG. 3, it is again shown that the connective bolts (13) between guide cap (10) and bow (8, 9) are virtually safe from attrition. Due to the shape of the guide caps (10), in fact, a good and secure guidance in the conveyor trough is possible, even if, for example, basins and saddles must be traversed.

Figure 4:
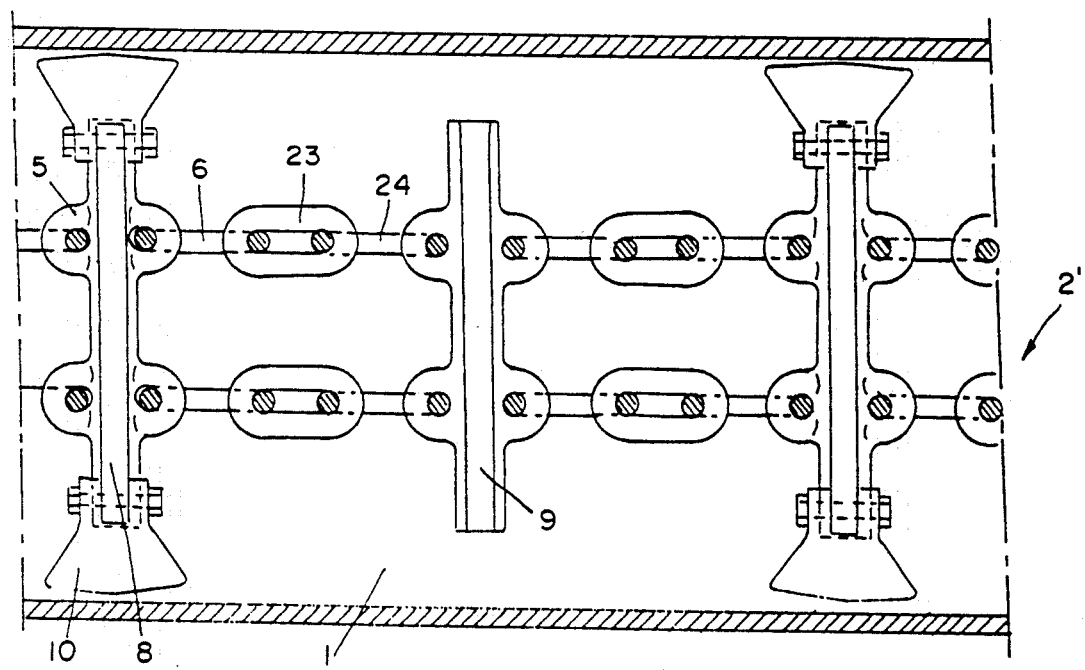

In those places where a lighter chain band (2') may be used based on certain circumstances, the model depicted in FIG. 4 is to be used. A blank track link (23) and an additional vertical chain link (24) each are used between the individual bows (8 and 9). Since the horizontal blank track links (23) have the same dimensions as the horizontal track links (5) which are integrated into the bow (8 and 9), a smooth operation of such a chain band (2) over the chain wheel is guaranteed. Here, too, the advantageous operation properties are given, where a somewhat diminished transmission of power in the range of the chain wheel is achieved by the fact that not every horizontal track link cooperates with a bow (8, 9) and is, therefore, fully planar with the chain wheel (25).

Figure 5:
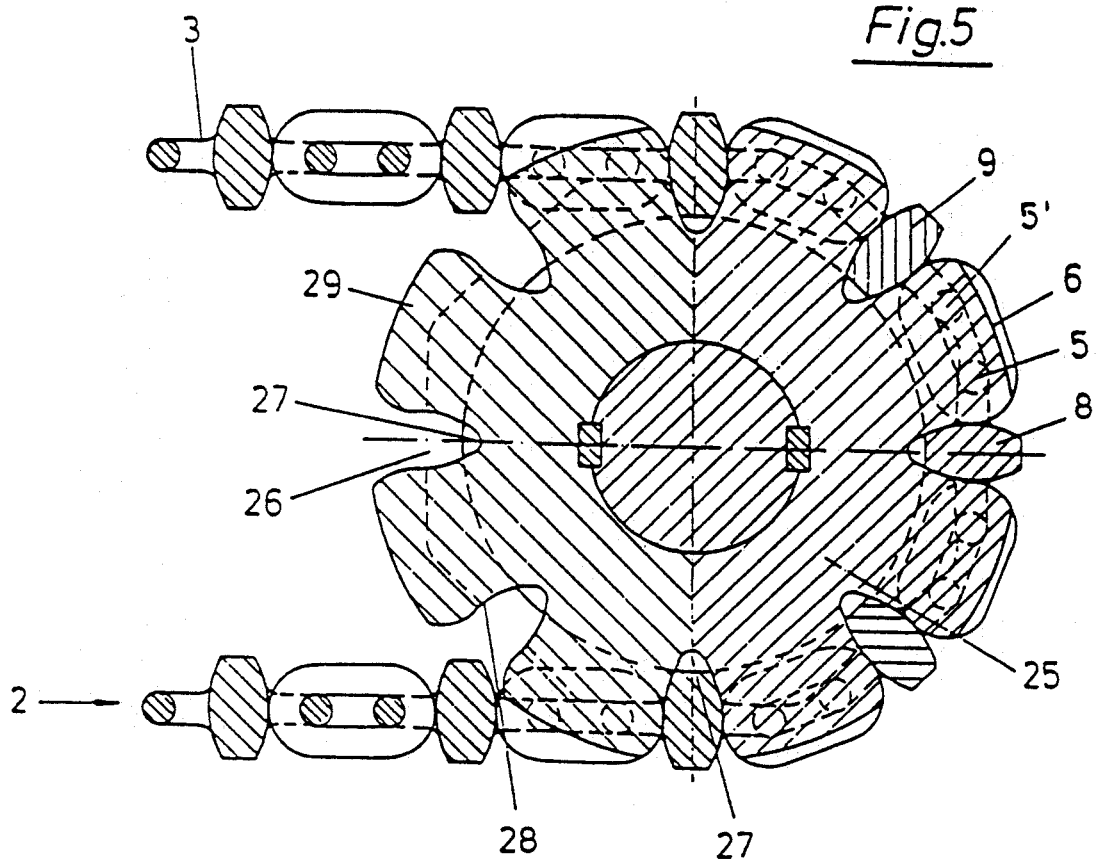

Such a chain wheel (25) is shown in FIG. 5 in section, to make visible the exact arrangement. The chain wheel has teeth gaps (26) between the teeth, into which the individual bows (8, 9) engage with their tooth shape. By building a gap depth (27) which extends beyond the individual bows (8, 9) it is ensured that the engagement of the individual bows (8, 9) into the chain wheel (25) is not affected by caking. Thus, it is ensured that the gap flanks (28) are pressed closely to each other corresponding with the tooth flanks (19), so that an advantageous introduction of force from the chain wheel (25) into the chain band (2) results. The chain band (2) depicted in FIG. 5, or the corresponding chain rope (3) corresponds with the model according to FIG. 1, where it is depicted in top view.

Figure 6:
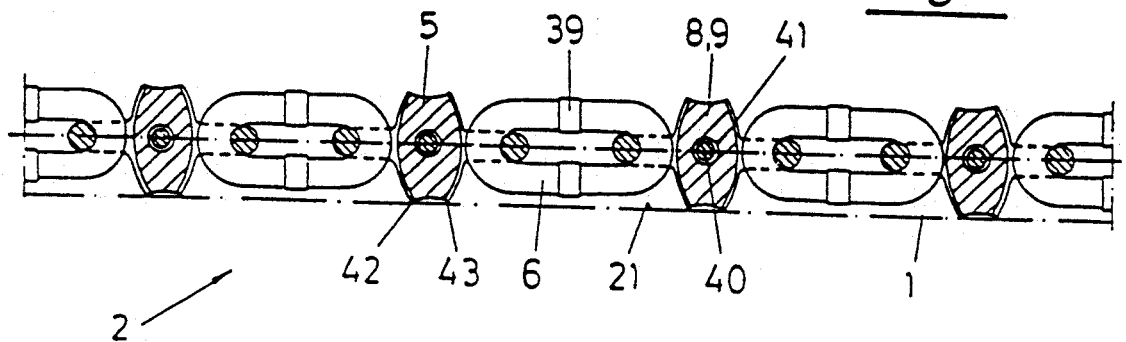

The model of a chain band (2) depicted in FIG. 6 differs from that according to FIG. 2 in that the vertical chain links (6) have a upsetting deformation (39), which is to indicate the simplified production of such types of chain links, as well as their connection or insertion into the individual adjacent horizontal track links (5).

In addition, the bows (8 or 9) have a centered inner bore (41) with a threaded rod (40) running through it. This way it is possible to connect such bows (8 or 9) allocated to each individual chain rope (3 or 4) with the threaded rod (40). Further details will be explained further on.

Finally, the individual bows (8, 9) show a concave bulging which results in cleansing edges (42, 43) that ensure a "clean sweep" of the tread of wheels (21) of the conveyor trough (1).

Figure 7:
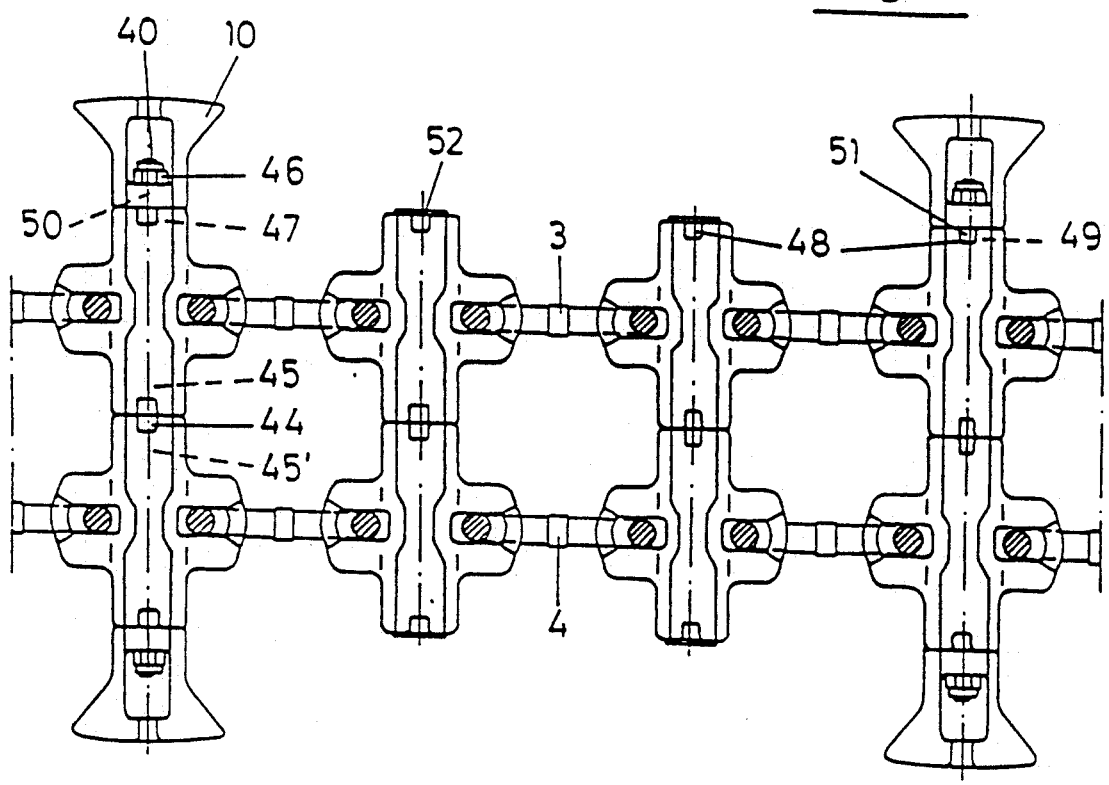
Figure 11:
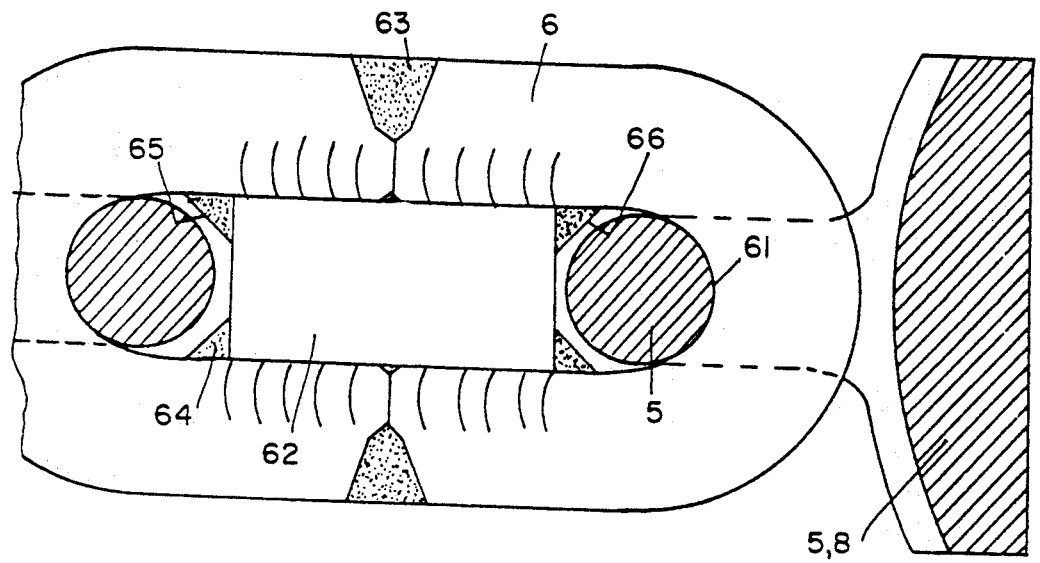

FIG. 7 shows a top view of such a chain band (2) made from both chain ropes (3 and 4). The connection of these chain ropes (3, 4) is made by the threaded rod (40) already mentioned, which is pushed through the inner bore (41) and mounted at the end with the holding bolt (46). In addition, graded bores (45) are provided for each bow (8, 9), in which a heavy spring cartridge (44)

is inserted, as FIG. 11 explains. This heavy spring cartridge (44) makes it possible that both chain ropes (3, 4) that are guided parallel to each other onto the chain wheel, still force a balanced transmission of power even with occurring irregularities, since a certain balance is possible due to the heavy spring cartridge (44).

Figure 8:
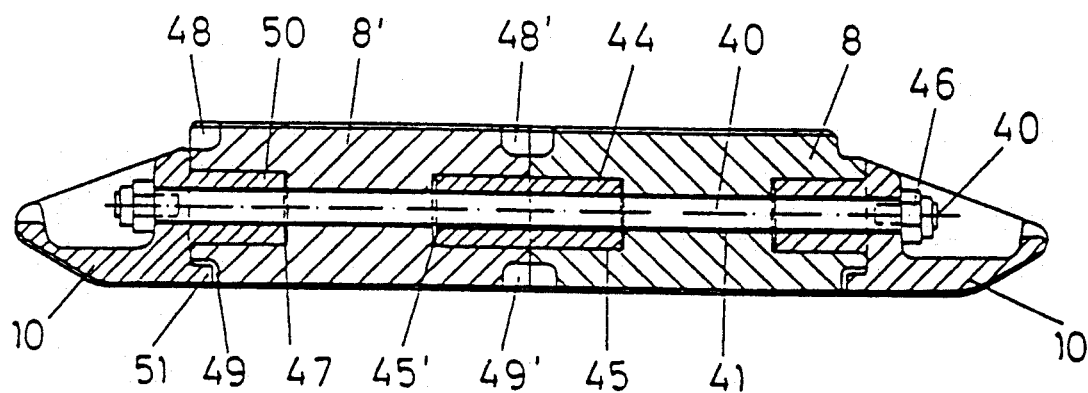

FIG. 8 also shows that the guide caps (10) are simultaneously fastened with the same threaded rod (40). These guide caps (10) have a carrier (50) that fits into the graded bore (47) of the bow (8, 9), which guarantees easy mounting. Torsion resistance is achieved by the fact that the bows (8, 9), in addition, have recesses (48, 49) that are formed corresponding to the carriers (51) of the guide caps (10), which makes simple mounting possible, as shown in FIG. 8.

Figure 9:
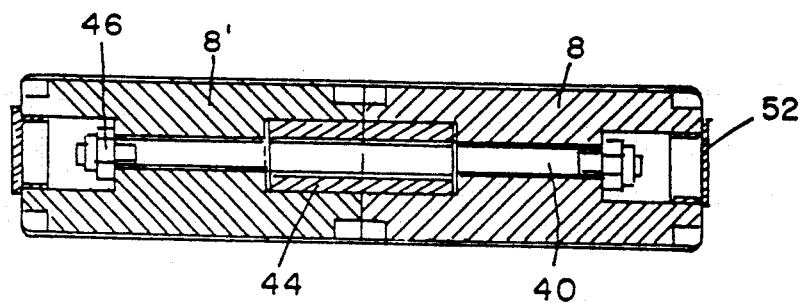

FIG. 9 shows two bows (8, 8') that are connected with each other, in the same mode as in FIG. 11, with the exception that here a shorter threaded rod (40) is used. The graded bores (47) here are closed off with protective caps (52), since guide caps are not used here. FIGS. 8 and 9 show that an advantageous assembly form is given, which allows for multiple use of the bows (8, 9) and their pertaining parts.

Figure 10:
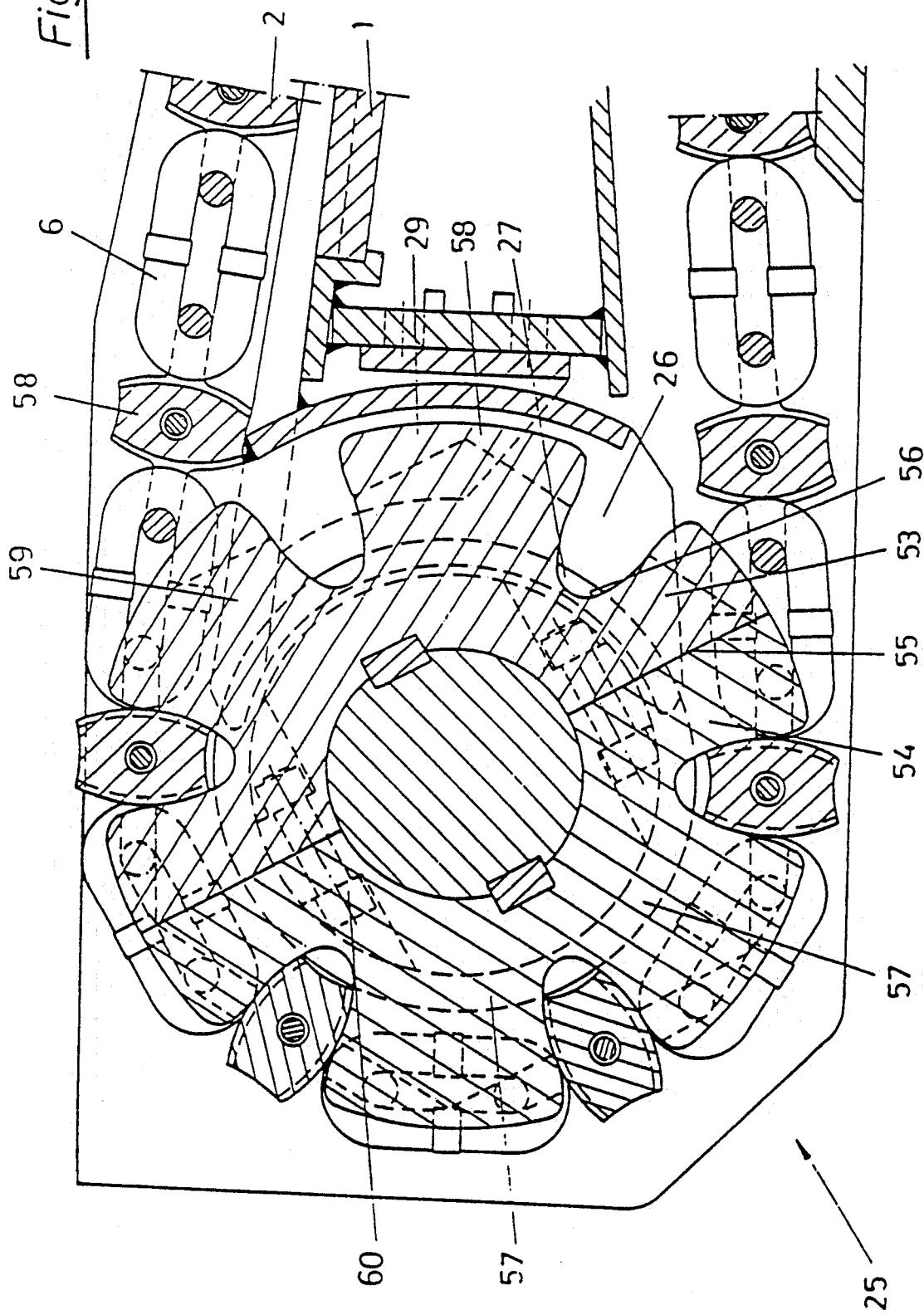

FIG. 10 depicts a chain wheel (25) that is provided for the rerouting of the chain band (2) which is equipped with the bows (8, 9) depicted in FIG. 9. The chain wheel (25) is assembled with two equal chain wheel halves (53, 54), where both chain wheel halves have a separating line (55) running through the teeth (29).

Here, too, the tooth gaps (26) are built in a manner that allows for secure insertion of the bows (8, 9) having the shape of an ellipse. The ellipse bow (56) is guided so that it reaches up into the groove (57) between the individual teeth, which prevents the manifestation of goods to be conveyed in this area. As mentioned before, the flanks (58) are pulled down so far that the stripper (59), too, may engage into this area and take away any remaining decontamination.

The two chain wheel halves (53, 54) are connected with each other by the fastening screws (60) resulting in guaranteed quick mounting. FIG. 10 shows beautifully how the horizontal chain links (5), i.e., the bows (8, 9) and the vertical chain links (6) are engaging into the chain wheel (25). This special engaging results in optimal introduction of force.

Figure 12:
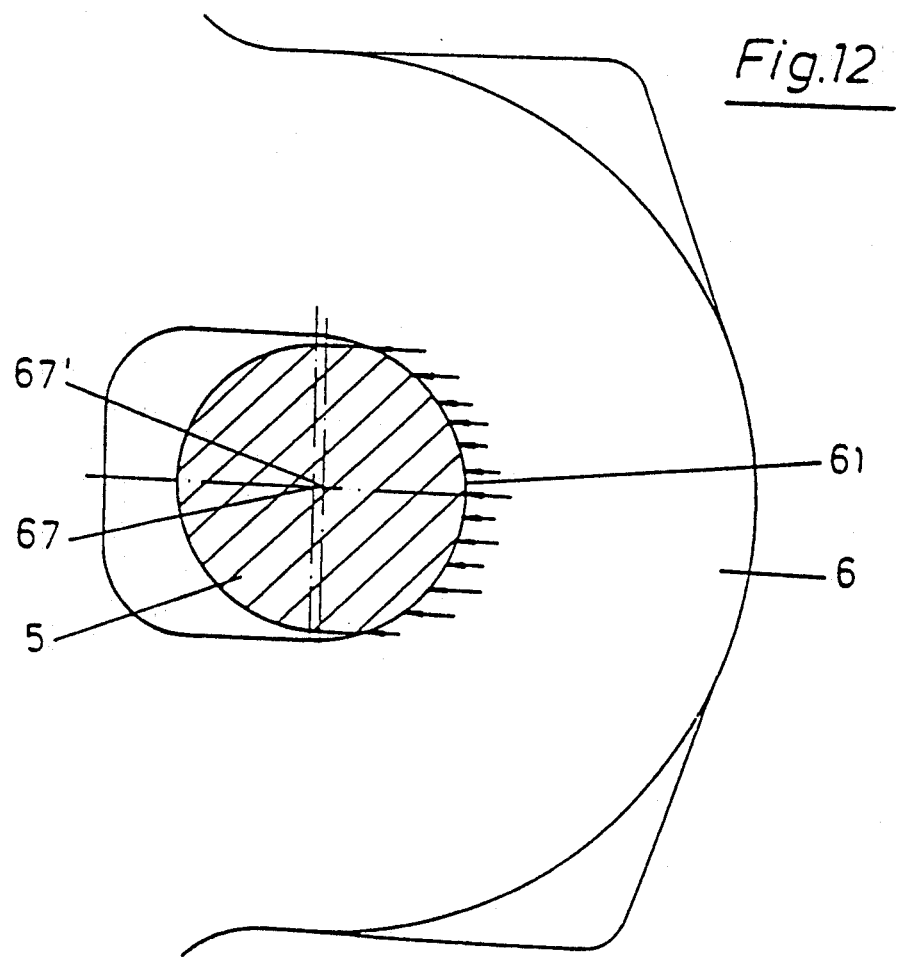

FIGS. 11 and 12 show track links in enlarged form to illustrate that a planar unit in the rolling range (61) is secured with track links (5, 6) formed according to the invention. The flattening that has been occurring up to now almost immediately after putting on a new chain band, and which has been causing about half of the permissible lengthening, is now removed. Therefore, substantially increased service lives can be achieved. A purposeful shape in the horizontal track links can be realized during moulding in the swage or a similar production process. The horizontal track links and the vertical track links (5, 6) are building a tooth chain in the illustration shown in FIGS. 14 and 15, in which intermediate pieces (62) with rounded off inner edges (65, 66) are allocated for the vertical track links. The vertical track links (6) consist of two equally built parts that are connected by means of welding seams (63) or with the intermediate pieces (62) by means of the welding seams (64). Based on this model, the intended planar connection of the individual track links with each other can be achieved. According to FIG. 12, the center (67, 67') here is somewhat shifted, which results in a balanced unit in the area of attrition (61).

Figure 15:
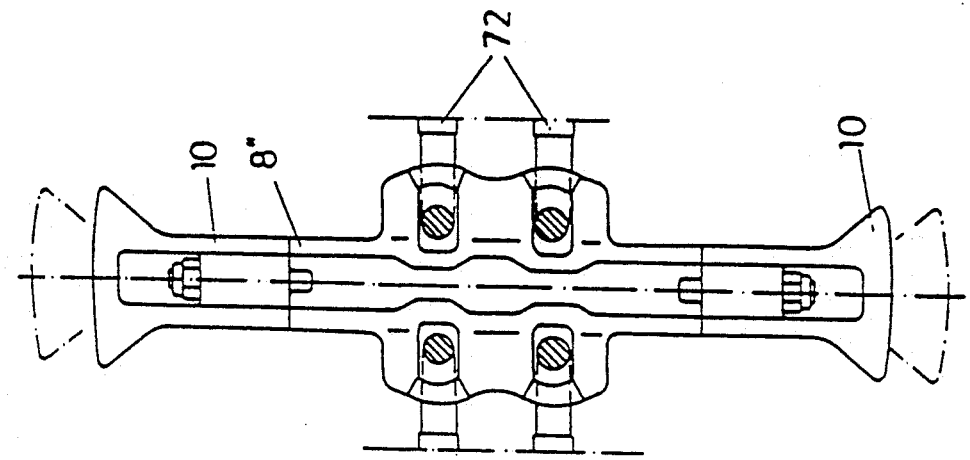
Figure 14:
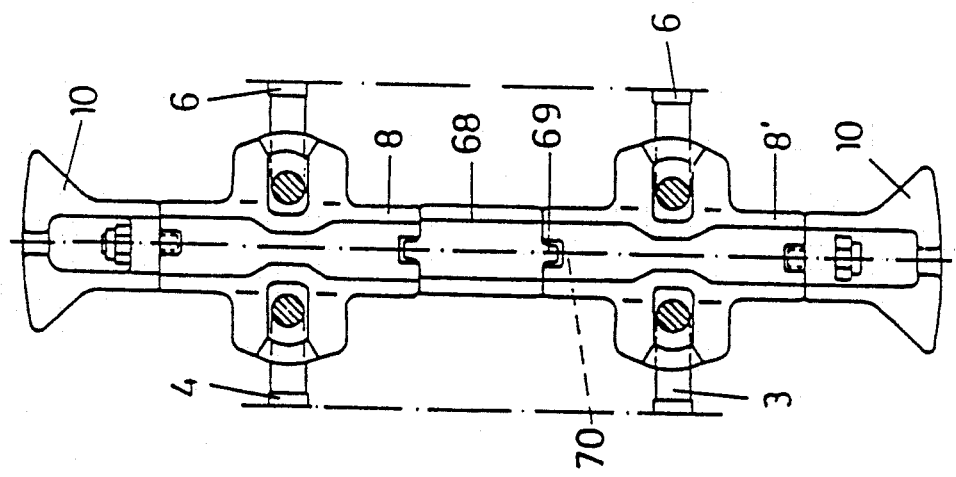
Figure 13:
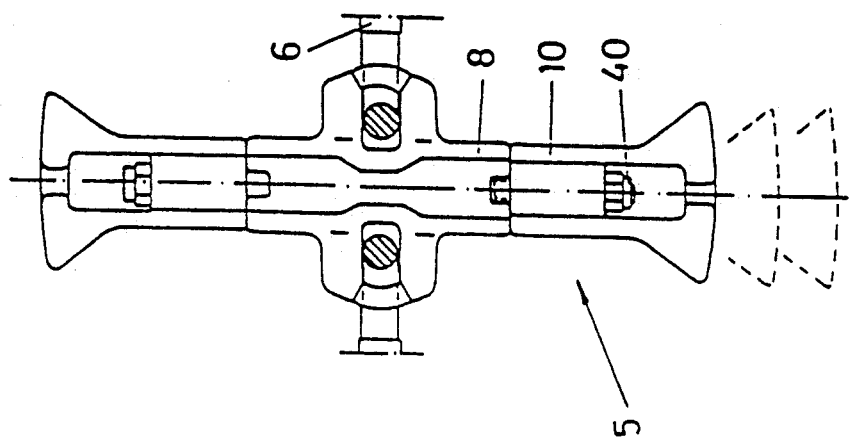

FIGS. 13, 14, and 15 show different models of chain bands (2). According to FIG. 13, a single-chain band is provided which is described before in FIG. 6, and fastened with the threaded rod (40) in its individual parts, i.e., connected with the guiding tracks (10).

According to FIG. 14, a two-chain band is realized, where the distance between the individual chain ropes (3,4) can be determined by means of extension pieces (68).

These extension pieces (68) have connective tappets (70) and carriers (69) that correspond to the graded bores (45) or the recesses (49). That way, such an extension piece fits well into the assembly principle, and the length of such pushers can be adjusted to the individual parts without major effort, or at least without having to use a completely new chain band.

The model shown in FIG. 15 is a double-center chain (72) that has a very stable bow (8"), since a constructed chain band with guide caps (10) is designed for use in bunker construction or carry-off conveying.

We claim:

1. Chain conveyor with chain band, a conveyor trough and conveyor trough ropes, particularly, a double-center chain band used for mass goods transportation in underground mining and tunnel construction, which is assembled from plural horizontal links and plural parallel vertical links that interlock and is equipped with drivers that are guided in the conveyor trough, and which is adjusted in its partition to plural chain wheels arranged on the ends of the conveyor trough ropes, whereby the links show an enlarged bearing surface enabling a good introduction of force of the chain wheels into the chain band, characterized in that the horizontal links (5) of each chain rope (3,4) lying next to each other have a horizontal center bridge that runs askew to a longitudinal direction of the link, said center bridge being built as an identical bow (8,9) extending beyond the links and shaped in the shape of a reversible tooth adjusted to each gap between consecutive teeth of the chain wheel, and further connecting the links with each other, and wherein plural guide caps are mounted on each end of selected bows.

2. Chain conveyor according to claim 1, characterized in that the bows (8,9) and the horizontal links (5) of the chain ropes (3,4) form one assembly unit.

3. Chain conveyor according to claim 1, characterized in that the bows (8,9) are made of sections connected with each other via a heavy spring cartridge (44) that can be plugged into both, and a threaded rod (40) that is built continuously.

4. Chain conveyor according to claim 1, characterized in that the bows (8,9) form an ellipse in their section, which are cut off in the range of each crown (20), resulting in a sliding surface (18).

5. Chain conveyor according to claim 4, characterized in that the sliding surface (18) is built in concave form.

6. Chain conveyor according to claim 1, characterized in that the horizontal links (5) are built extending on each end exactly centrally over the bows (8,9).

7. Chain conveyor according to claim 1, characterized in that the bows (8,9) comprise bores (12) that run on their end side in the direction of conveyance, and further wherein the guide caps (10) that are mounted on the ends of the bow fit into the guides (15) of the conveyor troughs 91) and wherein the bores on the ends of the bows each correspond to a connective bore (11) of the guide caps.

8. Chain conveyor according to claim 7, characterized in that the guide caps (10) have a recess (16) in the shape of a negative reversible tooth.

9. Chain conveyor according to claim 1, characterized in that the bows (8,9) and the corresponding horizontal links (5) are moulded in the swage as an assembly unit.

10. Chain conveyor according to claim 4, characterized in that the section line (18') in the elliptic bow is laid in a way that the bows extend on each side askew to the direction of conveying action beyond the vertical links (6).

11. Chain conveyor according to claim 1, characterized in that a horizontal link (23) and an additional vertical link (24) are fitted between the bows (8,9) with each of the horizontal links (5) and the vertical links (6).

12. Chain conveyor according to claim 11, characterized in that the blank links (23) have the same dimensions as the horizontal links (5).

13. Chain conveyor according to claim 3, characterized in that the bows (8,9) have graded bores (45) that take up the heavy spring cartridge (44), which, at the same time, is built to take up the connective tappets (70) of extension pieces (68).

14. Chain conveyor according to claim 3, characterized in that the threaded rods (40) are built extending beyond the bows (8,9) and co-fasten the guide caps (10).

15. Chain conveyor according to claim 3 and characterized in that the bows (8, 9) also have a graded bore (47) on the side facing the guide caps (10) and an additional recess (48,49), while the graded bores (47) and the recesses (48,49) allocated for both treads of wheels (21) are formed corresponding to the carriers (50,51) allocated to the guide caps.

16. Chain conveyor according to claim 1, characterized in that the chain wheels (25) having recesses (26) fitted for the links (5,6) are built in two parts, whereby the separating line (55) runs through the teeth (29).

17. Chain conveyor according to claim 16, characterized in that the teeth gaps (26) are formed elliptically corresponding to the bows (8,9), and the ellipse bow (56) is shaped inwardly.

18. Chain conveyor according to claim 17, characterized in that the groove (57) is formed between the flanks (58) of the teeth (29) and the teeth gaps (26), reaching deeper than the ellipse bow (56).

19. Chain conveyor according to claim 17, characterized in that a stripper (59) with balancing plate reaching into the deepest of the groove (57) is provided for the chain wheel (25).

* * * * *